United States Patent
Muramatsu et al.

(10) Patent No.: US 6,460,509 B1
(45) Date of Patent: Oct. 8, 2002

(54) DIRECT-FUEL-INJECTION-TYPE SPARK-IGNITION INTERNAL COMBUSTION ENGINE

(75) Inventors: Nobuyuki Muramatsu; Yasuhito Tsutsumi; Tatsuo Kobayashi; Toyokazu Baika; Souichi Matusita, all of Susono; Shizuo Abe, Aichi-ken; Takashi Hashima, Susono; Koukichi Fujimori, Fuji, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/495,118

(22) Filed: Feb. 1, 2000

(30) Foreign Application Priority Data

Feb. 5, 1999 (JP) .......................................... 11-028377

(51) Int. Cl.⁷ ................................................. F02B 5/00
(52) U.S. Cl. ...................................... 123/305; 123/298
(58) Field of Search ............................... 123/305, 298, 123/376

(56) References Cited

U.S. PATENT DOCUMENTS 4,793,305 A * 12/1988 Joyce ......................... 123/279
5,806,482 A * 9/1998 Igarashi et al. .............. 123/276
6,035,823 A * 3/2000 Koike et al. ................. 123/276
6,092,501 A * 7/2000 Matayoshi et al. .......... 123/276
6,269,789 B1 * 8/2001 Abe et al. .................... 123/294

FOREIGN PATENT DOCUMENTS

| DE | 198 54 923 A1 | 9/1999 |
| EP | 0 875 670 A2 | 11/1998 |
| JP | A-9-158736 | 6/1997 |
| JP | A-10-8969 | 1/1998 |
| JP | A 10-8969 | 1/1998 |

\* cited by examiner

Primary Examiner—John Kwon
(74) Attorney, Agent, or Firm—Oliff & Berridge, PLC

(57) ABSTRACT

A direct-fuel-injection-type spark-ignition internal combustion engine is disclosed. The engine comprises a spark plug, a cavity formed on the top surface of the piston, and a fuel injection valve for injecting fuel into the cavity in nearly the shape of a fan having a relative small thickness. In the engine, the side wall of the cavity facing the fuel injection valve, for leading the fuel to the vicinity of the spark plug, has a horizontal sectional shape consisting of a part of an ellipse shape of which two foci are at a position of the injection hole of the fuel injection valve and a position near to the spark plug in plan view, and the side wall has a deflecting portion to deflect the fuel toward the inside of the cavity.

19 Claims, 3 Drawing Sheets

DIRECT-FUEL-INJECTION-TYPE SPARK-IGNITION INTERNAL COMBUSTION ENGINE

BACKGROUND OF THE INVENTION

1. Field of the Invention

The present invention relates to a direct-fuel-injection-type spark-ignition internal combustion engine.

2. Description of the Related Art

There has heretofore been known stratified charge combustion produced by directly injecting fuel into a cylinder to form a mixture that can be favorably ignited (combustible mixture) only in the vicinity of a spark plug, at the ignition timing, to burn a lean mixture in the cylinder as a whole. To carry out the stratified charge combustion, in general, fuel is injected in the latter half of the compression stroke. It is intended that the thus injected fuel proceeds into a concave combustion chamber, is vaporized by robbing heat from the wall surfaces of the combustion chamber, is deflected by the shape of the combustion chamber toward the spark plug, and forms a combustible mixture near the spark plug.

In general, the fuel injection valve injects fuel in a shape that is conically concentrated. Therefore, a relatively long period is required while the fuel injected in the last stage of fuel injection becomes a combustible mixture utilizing the heat from the wall surfaces of the combustion chamber. To ensure this period, therefore, the fuel injection end timing must be advanced. An amount of fuel which can be injected in the latter half of the compression stroke, therefore, inevitably decreases, and stratified charge combustion must be abandoned in high engine load operations in which a relatively large amount of fuel is required. It has therefore been desired to carry out stratified charge combustion, which is effective in decreasing the consumption of fuel, over a wider range of engine operations.

Japanese Unexamined Patent Publication (Kokai) No. 9-158736 proposes injecting the fuel in the shape of a flat fan having a relatively small thickness by using a fuel injection valve having an injection hole in the shape of a slit. The thus injected fuel can rob heat from a wide area of the wall surfaces of the combustion chamber, making it possible to form a combustible mixture within a short period and to retard the timing for ending the injection of fuel. Thus, it is expected to increase an amount of injected fuel in the latter half of the compression stroke and to expand the region of stratified charge combustion toward the high engine load side.

In the above-mentioned related art, the fuel injected in a flat fan shape spreads in the width direction while progressing along the bottom wall of the combustion chamber. The side wall of the combustion chamber has a circular arc shape, in plan view, so that when the spreaded fuel moves up along the side wall of the combustion chamber, each part of fuel is converged toward the center of the side wall. Thus, a mass of combustible mixture is expected to be formed in the vicinity of the spark plug. Undoubtedly, if the side wall of the combustion chamber has a circular arc shape, each part of the spreaded fuel in the width direction is given a speed component toward the center of the side wall. However, all parts of the fuel do not necessarily move to the same position and thus a mass of combustible mixture may not be formed in the vicinity of the spark plug. Therefore, misfiring can occur.

SUMMARY OF THE INVENTION

Accordingly, an object of the present invention is to provide a direct-fuel-injection-type spark-ignition internal combustion engine in which fuel is injected in a flat fan shape having a relatively small thickness, and which can prevent misfiring in stratified charge combustion.

According to the present invention, there is provided a first direct-fuel-injection-type spark ignition internal combustion engine comprising: a spark plug, a cavity formed on the top surface of the piston, and a fuel injection valve for injecting fuel into the cavity in nearly the shape of a fan having a relatively small thickness, wherein the side wall of the cavity facing to the fuel injection valve, for leading the fuel to the vicinity of the spark plug, has a horizontal sectional shape consisting of a part of an ellipse shape of which two foci are at a position of the injection hole of the fuel injection valve and a position near to the spark plug in plan view, and the side wall has a deflecting portion to deflect said fuel toward the inside of the cavity.

According to the present invention, there is provided a second direct-fuel-injection-type spark-ignition internal combustion engine comprising: a spark plug, a cavity formed on the top surface of the piston, and a fuel injection valve for injecting fuel into the cavity in nearly the shape of a fan having a relatively small thickness, wherein the side wall of the cavity facing to the fuel injection valve, for leading the fuel to the vicinity of the spark plug, has a horizontal sectional shape consisting of a part of a parabola shape of which the focus is at a position near to the spark plug in plan view, and the side wall has a deflecting portion to deflect the fuel toward the inside of said cavity.

According to the present invention, there is provided a third direct-fuel-injection-type spark-ignition internal combustion engine comprising: a spark plug, a cavity formed on the top surface of the piston, and a fuel injection valve for injecting fuel into the cavity in nearly the shape of a fan having a relatively small thickness, wherein in the side wall of the cavity facing to the fuel injection valve, for leading the fuel to the vicinity of the spark plug, both end portions thereof have a horizontal sectional shape consisting of a part of an ellipse shape of which two foci are at a position of the injection hole of the fuel injection valve and a position near to the spark plug in plan view, a center portion thereof has a horizontal sectional shape consisting of a part of a parabola shape of which the focus is at a position near to the spark plug in plan view, and the side wall has a deflecting portion to deflect the fuel toward the inside of the cavity.

The present invention will be more fully understood from the description of preferred embodiments of the invention set forth below, together with the accompanying drawings.

DESCRIPTION OF THE PREFERRED EMBODIMENT

Figure 1:
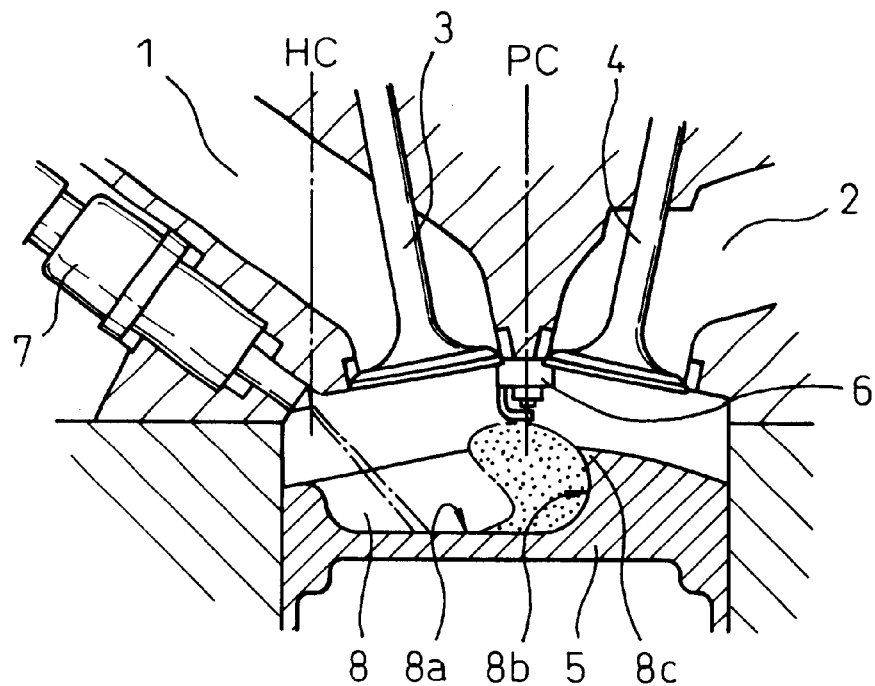
FIG. 1 is a sectional view schematically illustrating a part of direct-fuel-injection-type spark-ignition internal combustion engine according to a first embodiment of the present invention.
Figure 2:
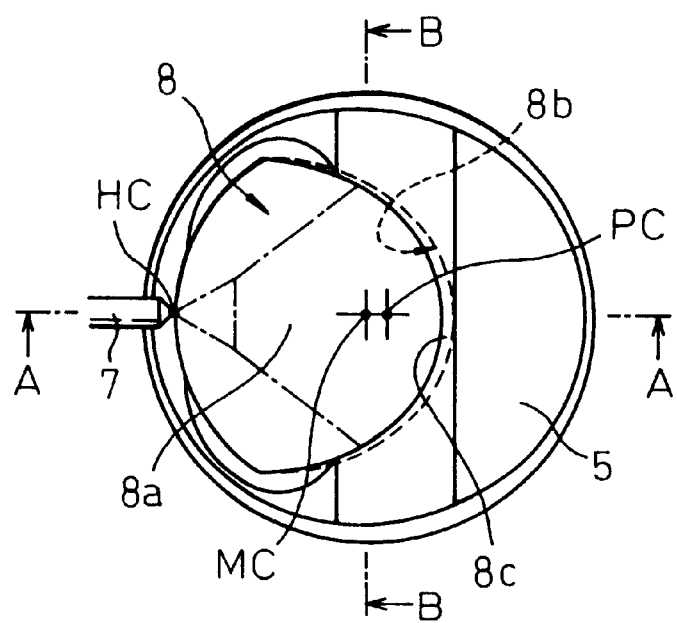
FIG. 2 is a plan view of a piston shown in FIG. 1.

FIG. 1 is a sectional view schematically illustrating a part of direct-fuel-injection-type spark-ignition internal combustion engine according to a first embodiment of the present invention. FIG. 2 is a plan view of a piston shown in FIG. 1. In these figures, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, and 6 denotes a spark plug arranged near to the center of the upper wall of the cylinder. The fuel injection valve 7 injects fuel in a flat fan shape having a relatively small thickness.

For example, in a uniform charge combustion region where a high engine output is required, the fuel injection valve 7 injects a required amount of fuel in the intake stroke thereby to form a uniform charge mixture in the cylinder at the ignition timing. On the other hand, in a stratified charge combustion region, the fuel injection valve 7 injects a required amount of fuel in the latter half of the compression stroke. As shown in FIG. 1, the fuel injected in the latter half of the compression stroke enters into a concave cavity 8 formed in the top surface of the piston 5, and collides with the bottom wall 8a of the cavity 8. Thereafter, the fuel proceeds toward the side wall 8b of the cavity 8 which faces the fuel injection valve 7 along the bottom wall 8a, while spreading in the width direction to be vaporized gradually.

Figure 3:
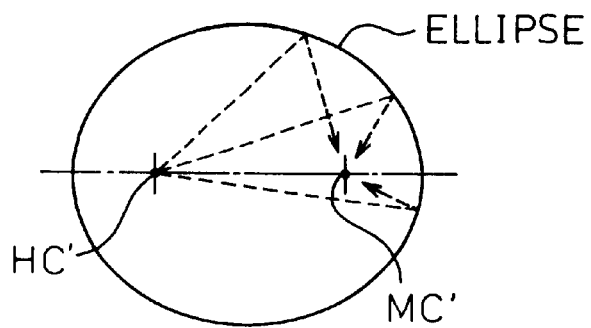
FIG. 3 is a view explaining a geometrical character of an ellipse.

The side wall 8b of the cavity 8 has a horizontal sectional shape consisting of a part of an ellipse shape. In plan view, the two foci of this ellipse shape are at a position of the injection hole of the fuel injection valve 7 and a position near to the spark plug 6. Namely, a sectional shape of the side wall 8b in a particular horizontal plane consists of a part of an ellipse in which the two foci are at an intersecting point (HC') of a first vertical line (HC) passing through the injection hole of the fuel injection valve 7 and the particular horizontal plane, and an intersecting point (MC') of a second vertical line (MC) passing through a position near the center line (PC) of the spark plug 6 and the particular horizontal plane, as shown in FIG. 3. Furthermore, the side wall 8b of the cavity 8 has a deflecting portion 8c to deflect fuel toward the inside of the cavity 8.

In general, as shown in FIG. 3, an ellipse has a geometrical character in which all radial lines from one focus converge into another focus by reflecting on the ellipse. Therefore, if the side wall 8b is made an ellipse shape as mentioned above and the fuel is finally directed toward the inside of the cavity 8 by the deflecting portion 8c, the fuel injected from the first vertical line (HC) passing through one focus spreads on the bottom wall 8a of the cavity 8 in the width direction but the side wall 8b and the deflecting portion 8c make the fuel finally converge on the second vertical line (MC) passing through another focus. When converging on the second vertical line (MC), the fuel has robbed sufficiently heat from the bottom wall 8a and the side wall 8b of the cavity 8, and has vaporized.

In the distances between the side wall 8b and the second vertical line (MC), the distance on the center portion of the side walls 8b is small and the distances on the both end portions thereof are long. Thus, for each part of fuel, a moving distance from the side wall 8b to the second vertical line (MC) differs another. Therefore, even if each part of fuel is deflected toward the inside of the cavity 8 at the same angle, within a horizontal plane, by the deflecting portion 8c, each part of fuel reaches the second vertical line (MC) at a different height. Thus, at the ignition timing, a mass of combustible mixture in almost a column shape is formed around the second vertical line (MC) in the vicinity of the center line (PC) of the spark plug 6, and the mixture surely contacts with the spark gap of the spark plug 6. Therefore, a good stratified combustion can be realized without misfiring.

If the second vertical line (MC), to which all parts of fuel are converged, corresponds to the center line (PC) of the spark plug 6, the formed combustible mixture can contact with the spark gas of the spark plug 6 more surely. In this case, the center portion of the combustible mixture in the almost column shape starts initially to burn. In such burning, the center portion of the combustible mixture expands suddenly and therefore the circumferential portion of the combustible mixture is easily broken up. If the concentration of the combustible mixture is relative thin, flame does not favorably propagate to the broken circumferential portion of the mixture and thus combustion can deteriorate.

In the present embodiment, the second vertical line (MC) to which all parts of fuel are converged is spaced from the center line (PC) of the spark plug 6. Therefore, the circumferential portion of the combustible mixture in the almost column shape starts initially to burn and flame propagates in the diameter direction in the combustible mixture in the almost column shape. Accordingly, the initially burned mixture can expand in the direction opposite to the unburned mixture and thus the unburned mixture is not broken up. Thus, even if the concentration of the combustible mixture is relative thin, flame favorably propagates in the combustible mixture. This makes it possible to reduce an amount of injected fuel in stratified charge combustion, and therefore the fuel consumption, still more. In particular, in the present invention, the second vertical line (MC) to which all parts of fuel are converged is spaced from the center line (PC) of the spark plug 6 to the fuel injection valve side. Therefore, the initially burned mixture can expand freely to the large space in the fuel injection valve side of the cavity 8 and thus the unburned mixture can be surely prevented from breaking up.

Figure 4A:
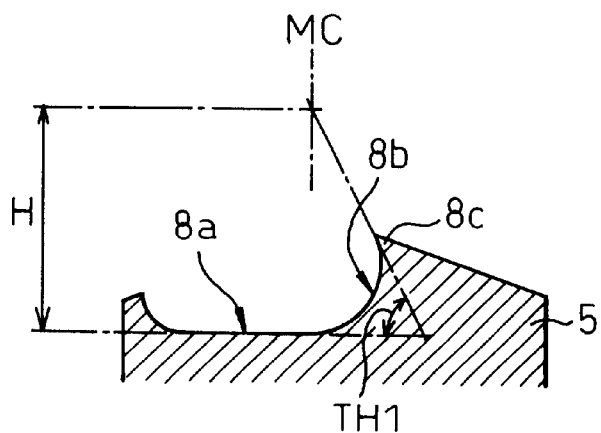
FIG. 4(A) is a sectional view taking along line (A)—(A) in FIG. 2.

Furthermore, in the present embodiment, as shown in FIG. 4(A) which is a sectional view taking along the line (A)—(A) in FIG. 2, the deflecting portion 8c positioned on the center portion of the side wall 8b has a first acute angle (TH1) with a horizontal plane, and the deflecting portion 8c positioned on the both end portions of the side wall 8b has a second acute angle (TH2) with a horizontal plane which is smaller than the first acute angle (TH1). In the present embodiment, the bottom wall 8a of the cavity 8 is a horizontal plane. However, this does not limit the present invention. The bottom wall 8a is not required to consist of a horizontal plane.

By such construction of the deflecting portion 8c, even if each part of fuel has a different moving distance from the side wall 8b to the second vertical line (MC), each part of fuel can reach on the second vertical line (MC) close to the same height position. Thus, all parts of fuel can be converged still more so that a mixture formed by a smaller amount of injected fuel can also be surely ignited. This can improve the fuel consumption, for example, in an engine idle condition.

Figure 4B:
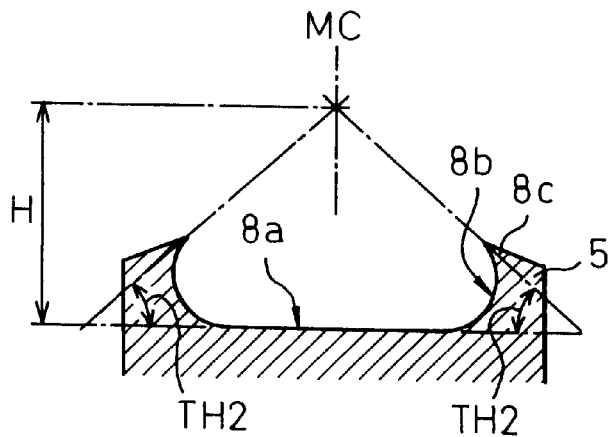
FIG. 4(B) is a sectional view taking along line (B)—(B) in FIG. 2.

Furthermore, as shown in FIG. 4, if the first acute angle (TH1) and the second acute angle (TH2) are decided suitably on basis of a position of the second vertical line (MC) and a shape of the side wall 8b, and an acute angle with a horizontal plane in each part of the deflecting portion 8c differs gradually each other, all parts of fuel can be converged on the second vertical line (MC) at the same height position (the height (H) from the horizontal plane) and thus even if an amount of injected fuel is very small, the formed mixture can be surely burned.

Figure 5:
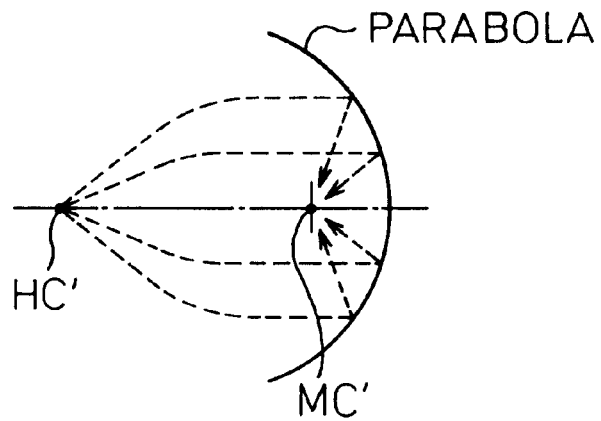
FIG. 5 is a view explaining a direct-fuel-injection-type spark-ignition internal combustion engine according to second embodiment of the present invention.

FIG. 5 is a view explaining a direct-fuel-injection-type spark-ignition internal combustion engine according to a second embodiment of the present invention, which corresponds to FIG. 3. In the second embodiment, a sectional shape of the side wall of the cavity in a particular horizontal plane consists of a parabola in which the focus is an intersecting point (MC') of the second vertical line (MC) passing through a position near the center line (PC) of the spark plug 6 and the particular horizontal plane. Furthermore, the side wall of the cavity has a deflecting portion to deflect fuel toward the inside of the cavity on the basis of the same idea in the first embodiment.

A parabola has a geometrical character in which all parallel lines with the center line thereof converge into the focus by reflecting on the parabola. Here, in general stratified charge combustion, the higher an engine load becomes, the larger an amount of injected fuel and an amount of intake air become. Therefore, in stratified charge combustion in high engine load operating conditions, a pressure within the cylinder in the latter half of the compression stroke is relative high due to a large amount of intake air. If a pressure within the cylinder is relative low as in low engine load operating conditions, the injected fuel in a flat fan shape progresses on the bottom wall of the cavity while spreading in the width direction due to the inertia thereof as mentioned above. However, when a pressure within the cylinder is relative high, it is difficult for the fuel to spread on the bottom wall greatly in the width direction. Thus, as shown in FIG. 5, the fuel spreads on the bottom wall in the width direction to some degree and this width of fuel is maintained.

Accordingly, if the side wall of the cavity is a parabola, in particular, when a pressure within the cylinder is relative high as in high engine load operating conditions, each part of fuel progressing on the bottom wall of the cavity can be converged on the second vertical line (MC) as a combustible mixture by the side wall of the cavity. Thus, effects as same as that in the first embodiment can be obtained.

Figure 6:
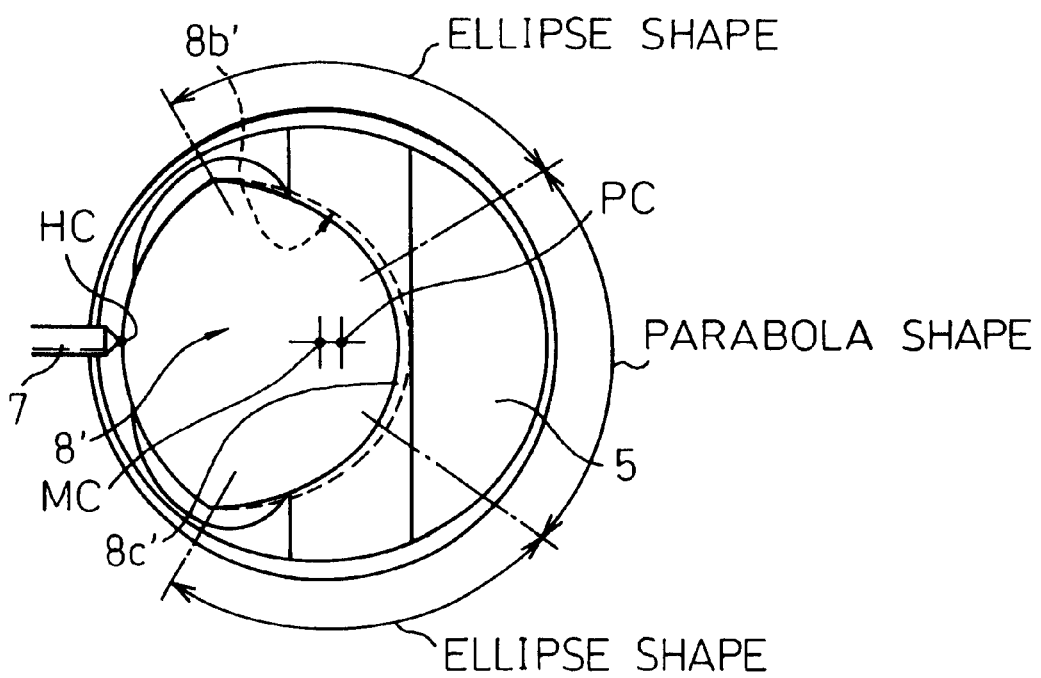
FIG. 6 is a plan view of a piston of a direct-fuel-ingection-type spark-ignition internal combustion engine according to a third embodiment of the present invention.

FIG. 6 is a plan view of a piston of direct-fuel-ingection-type spark-ignition internal combustion engine according to a third embodiment of the present invention, which corresponds to FIG. 2. In the third embodiment, a sectional shape of the both end portions of the side wall 8b', of the cavity 8' in a particular horizontal plane consists of a part of an ellipse in which the two foci are at an intersecting point of the first vertical line (HC) passing through the injection hole of the fuel injection valve 7 and the particular horizontal plane, and an intersecting point of the second vertical line (MC) passing through a position near the center line (PC) of the spark plug 6 and the particular horizontal plane, as shown in FIG. 3. A sectional shape of the center portion of the side wall 8b' of the cavity 8' in the particular horizontal plane consists of a parabola in which the focus is at an intersecting point of the second vertical line (MC) passing through the position near the center line (PC) of the spark plug 6 and the particular horizontal plane, as shown in FIG. 5. Furthermore, the side wall 8b' has a deflecting portion 8c' as same as in the first embodiment.

As mentioned above, when a pressure within the cylinder in the latter half of the compression stroke, i.e., at the fuel injection timing in stratified charge combustion, is relative low, it is desirable that the side wall of the cavity is an ellipse shape. When the pressure within the cylinder is relative high, it is desirable that the side wall of the cavity is a parabola shape. When the pressure within the cylinder is relative high, fuel progressing on the bottom wall of the cavity does not spread greatly in the width direction. Thus, as the present embodiment, if only the center portion of the side wall 8b' is a parabola shape, all parts of fuel can be converged on the second vertical line (MC).

When the pressure within the cylinder is relative low, fuel progressing on the bottom wall of the cavity spreads greatly in the width direction and the both end parts of the fuel can be converged on the second vertical line (MC) by the both end portions of the side wall 8b' of the cavity which are made a part of an ellipse, as the present embodiment. On the other hand, the center part of fuel cannot be converged strictly on the second vertical line (MC). However, the center part of fuel is not deflected to a position very far from the second vertical line (MC) and but is deflected to a position near to the second vertical line (MC). Thus, a mass of combustible mixture can be positioned near to the second vertical line (MC).

Accordingly, as the present embodiment, if the center portion of the side wall 8b' of the cavity 8' is made a part of a parabola and the both end portions of the side wall 8b ' of the cavity 8' are made a part of an ellipse, a mass of combustible mixture can be favorably formed around the second vertical line (MC) in spite of a pressure within the cylinder at the fuel injection timing and thus good stratified charge combustion can be realized.

Although the invention has been described with reference to specific embodiments thereof, it should be apparent that numerous modifications can be made thereto by those skilled in the art, without departing from the basic concept and scope of the invention.

What is claimed is:

1. A direct-fuel-injection-type spark-ignition internal combustion engine comprising a spark plug, a cavity formed on the top surface of the piston, and a fuel injection valve for injecting fuel into said cavity in nearly the shape of a fan having a relative small thickness, wherein the side wall of said cavity facing said fuel injection valve, for leading said fuel to the vicinity of said spark plug, has a horizontal sectional shape consisting of a part of an ellipse shape of which two foci are at a position of the injection hole of said fuel injection valve and a position near to said spark plug in plan view, and said side wall has a deflecting portion to deflect said fuel toward the inside of said cavity.

2. A direct fuel injection-type spark ignition internal combustion engine according to claim 1, wherein said position near to said spark plug is spaced from the center line of said spark plug.

3. A direct fuel injection-type spark ignition internal combustion engine according to claim 2, wherein said position near to said spark plug is spaced from the center line of said spark plug toward the fuel injection valve side.

4. A direct fuel injection-type spark ignition internal combustion engine according to claim 1, wherein said deflecting portion has acute angles with a horizontal plane, an acute angle of said deflecting portion positioned on the center portion of said side wall being larger than an acute angle thereof positioned on the both end portions of said side wall.

5. A direct fuel injection-type spark ignition internal combustion engine according to claim 2, wherein said deflecting portion has acute angles with a horizontal plane, an acute angle of said deflecting portion positioned on the center portion of said side wall being larger than an acute angle thereof positioned on the both end portions of said side wall.

6. A direct fuel injection-type spark ignition internal combustion engine according to claim 3, wherein said deflecting portion has acute angles with a horizontal plane, an acute angle of said deflecting portion positioned on the center portion of said side wall being larger than an acute angle thereof positioned on the both end portions of said side wall.

7. A direct-fuel-injection-type spark-ignition internal combustion engine comprising a spark plug, a cavity formed on the top surface of the piston, and a fuel injection valve for injecting fuel into said cavity in nearly the shape of a fan having a relative small thickness, wherein the side wall of said cavity facing said fuel injection valve has a curved horizontal sectional shape which has a focus at a position near to said spark plug in plan view to lead said fuel to the vicinity of said spark plug, and said side wall has a deflection portion to deflect said fuel toward the inside of said cavity.

8. A direct-fuel-injection-type spark-ignition internal combustion engine comprising a spark plug, a cavity formed on the top surface of the piston, and a fuel injection valve for injecting fuel into said cavity in nearly the shape of a fan having a relative small thickness, wherein the side wall of said cavity facing said fuel injection valve, for leading said fuel to the vicinity of said spark plug, has a horizontal sectional shape consisting of a part of a parabola shape of which a focus is at a position near to said spark plug in plan view, and said side wall has a deflecting portion to deflect said fuel toward the inside of said cavity.

9. A direct-fuel-injection-type spark-ignition internal combustion engine comprising a spark plug, a cavity formed on the top surface of the piston, and a fuel injection valve for injecting fuel into said cavity in nearly the shape of a fan having a relative small thickness, wherein in the side wall of said cavity facing said fuel injection valve, for leading said fuel to the vicinity of said spark plug, both end portions thereof have a horizontal sectional shape consisting of a part of an ellipse shape of which two foci are at a position of the injection hole of said fuel injection valve and a position near to said spark plug in plan view, a center portion thereof has a horizontal sectional shape consisting of a part of a parabola shape of which the focus is at a position near to said spark plug in plan view, and said side wall has a deflecting portion to deflect said fuel toward the inside of said cavity.

10. A direct fuel injection-type spark ignition internal combustion engine according to claim 8, wherein said position near to said spark plug is spaced from the center line of said spark plug.

11. A direct fuel injection-type spark ignition internal combustion engine according to claim 9, wherein said position near to said spark plug is spaced from the center line of said spark plug.

12. A direct fuel injection-type spark ignition internal combustion engine according to claim 10, wherein said position near to said spark plug is spaced from the center line of said spark plug toward the fuel injection valve side.

13. A direct fuel injection-type spark ignition internal combustion engine according to claim 11, wherein said position near to said spark plug is spaced from the center line of said spark plug toward the fuel injection valve side.

14. A direct fuel injection-type spark ignition internal combustion engine according to claim 8, wherein said deflecting portion has acute angles with a horizontal plane, an acute angle of said deflecting portion positioned on the center portion of said side wall being larger than an acute angle thereof positioned on the both end portions of said side wall.

15. A direct fuel injection-type spark ignition internal combustion engine according to claim 9, wherein said deflecting portion has acute angles with a horizontal plane, an acute angle of said deflecting portion positioned on the center portion of said side wall being larger than an acute angle thereof positioned on the both end portions of said side wall.

16. A direct fuel injection-type spark ignition internal combustion engine according to claim 10, wherein said deflecting portion has acute angles with a horizontal plane, an acute angle of said deflecting portion positioned on the center portion of said side wall being larger than an acute angle thereof positioned on the both end portions of said side wall.

17. A direct fuel injection-type spark ignition internal combustion engine according to claim 11, wherein said deflecting portion has acute angles with a horizontal plane, an acute angle of said deflecting portion positioned on the center portion of said side wall being larger than an cute angle thereof positioned on the both end portions of said side wall.

18. A direct fuel injection-type spark ignition internal combustion engine according to claim 12, wherein said deflecting portion has acute angles with a horizontal plane, an acute angle of said deflecting portion positioned on the center portion of said side wall being larger than an acute angle thereof positioned on the both end portions of said side wall.

19. A direct fuel injection-type spark ignition internal combustion engine according to claim 13, wherein said deflecting portion has acute angles with a horizontal plane, and acute angle of said deflecting portion positioned on the center portion of said side wall being larger than an acute angle thereof positioned on the both end portions of said side wall.

* * * * *